J. F. PALMER.
PNEUMATIC TIRE.
APPLICATION FILED AUG. 7, 1911.
1,083,293.
Patented Jan. 6, 1914.
2 SHEETS—SHEET 1.
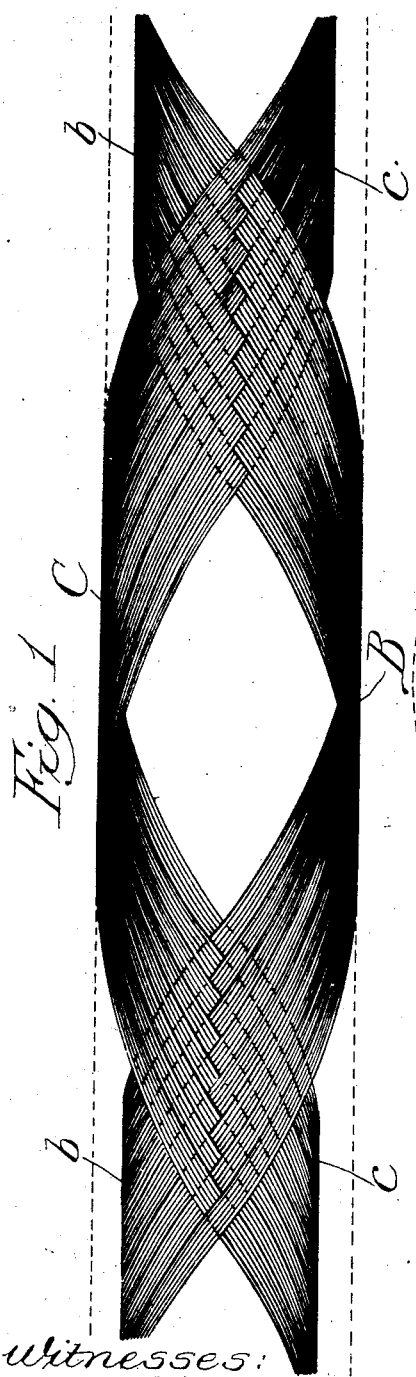
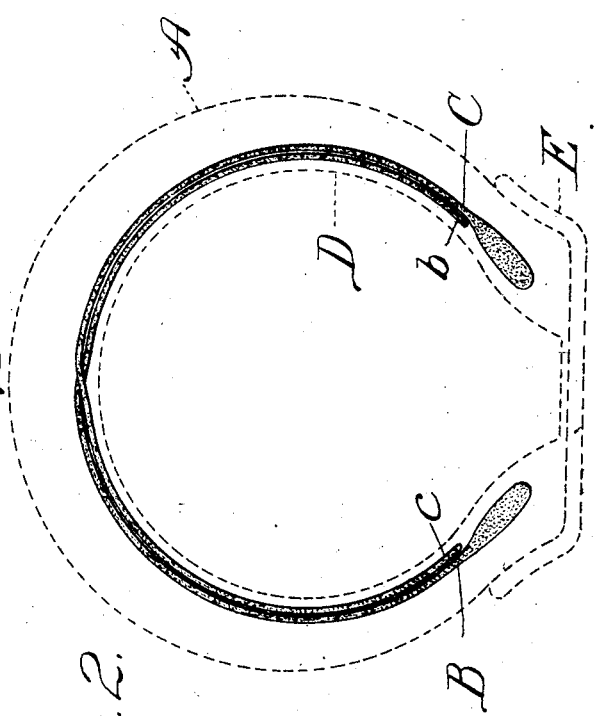
Witnesses:
John Enders
Henry A. Parks
Inventor:
John F. Palmer,
by Sheridan, Wilkinson, Scott & Richmond,
Attys.

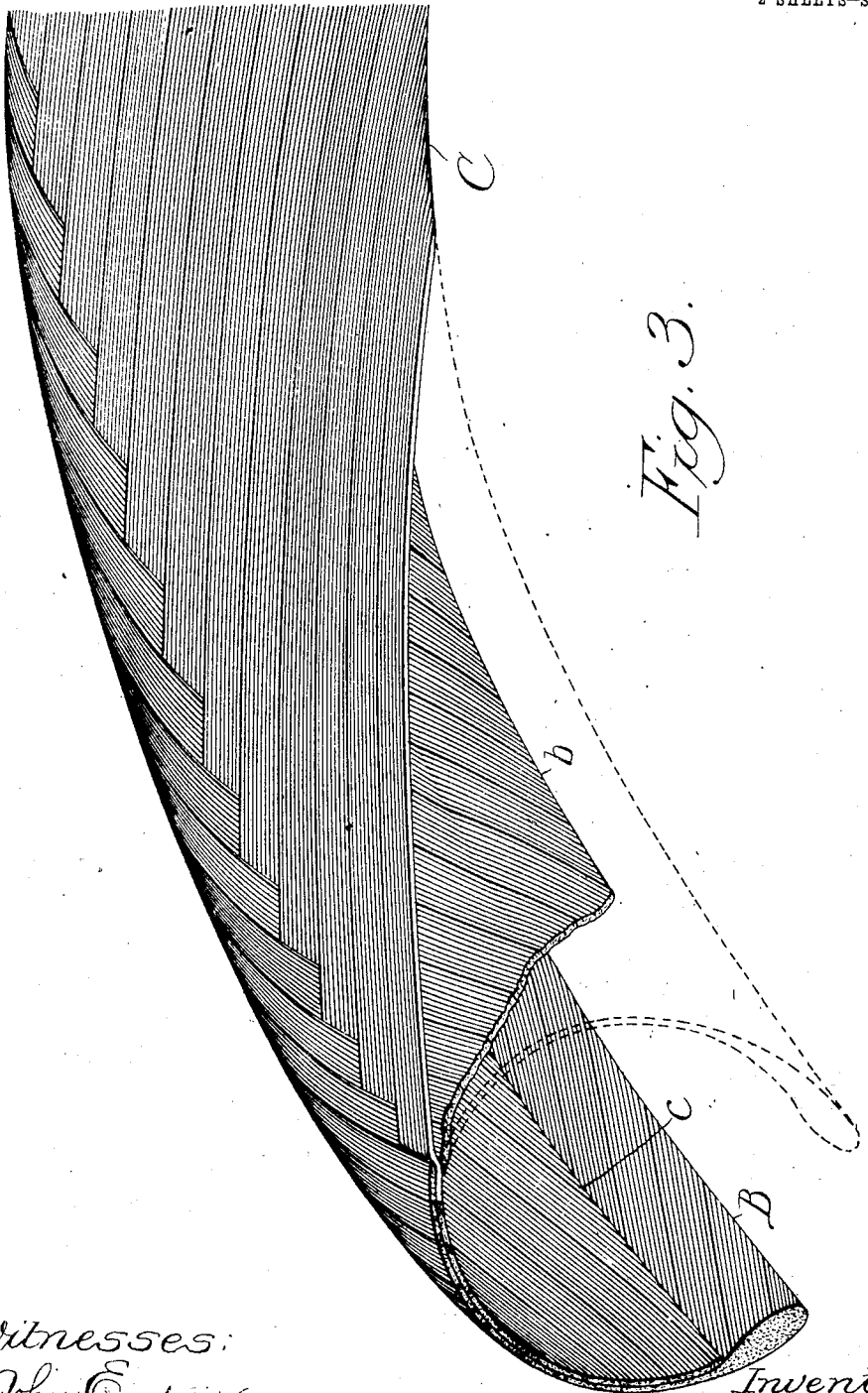

UNITED STATES PATENT OFFICE.

JOHN F. PALMER, OF RIVERSIDE, ILLINOIS.

PNEUMATIC TIRE.

1,083,293.

Specification of Letters Patent.

Patented Jan. 6, 1914.

Application filed August 7, 1911. Serial No. 642,752.

*To all whom it may concern:*

Be it known that I, JOHN F. PALMER, a citizen of the United States, residing at Riverside, in the county of Cook and State of Illinois, have invented certain new and useful Improvements in Pneumatic Tires, of which the following is a specification.

My invention relates in general to pneumatic tires, and more particularly to tire casings for inclosing inner tubes of the type of tires known as "double-tube tires".

In order that a pneumatic tire may withstand the great pressure of the air contained therein and the shocks incident to the usage of such tires, it is necessary to embed in the rubber of the tire a strain resisting fabric to prevent the distortion of the tire and maintain it in its normal symmetrical form. A strain resisting fabric in order to have the required flexibility and at the same time the necessary strength must be composed of layers of fabric securely connected to each other by the rubber of the tire or some analogous means. One of the greatest difficulties encountered in the manufacture of pneumatic tire casings is to provide a construction of strain resisting fabric in which each layer and each member of each layer will bear its proportion of strain and not become separated when the tire is subjected to the varied conditions incident to its use.

The separation of the layers of the strain resisting fabric, which results in the rapid destruction of the tire, is due to unequal strains imposed upon the different layers, and the unequal tension of the members of the layers. When the cord, thread, or the aggregation of the cords or threads forming bands, composing the members of a layer of fabric, extend around the tread and sides of the tire in parallel separate superposed layers, the inner layer is directly subjected to the pressure of the contained air, and the outer layers afford the resistance against which the contained air forces the inner layers, which tends to produce unequal or unbalanced strains and inequalities in tension on the different layers and members of the layers with consequent movement and damage, and possible separation.

I have discovered that a more perfect balancing of the strains upon the layers of fabric, due to the contained air pressure and to the compression and expansion of a tire in usage, may be obtained if the fabric is not arranged in superposed parallel layers, but is formed of layers which intersect intermediate of the sides of the tire, one layer being outside of the adjacent layer at one side of, or at one longitudinal portion of, the tire, and inside of the same adjacent layer at the other side, or at another longitudinal portion of the tire. I accomplish this result by arranging the strain resisting fabric in layers intersecting longitudinally of the tire, which in the embodiment of my invention herein disclosed is attained by interweaving the threads, cords or bands forming adjacent layers of fabric along a longitudinal line intermediate of the two edges of the casing. The layers are therefore symmetrically arranged and each is subjected to the same pressure and strains, and a balance of resistance to strains is maintained. In other words, the balance of resistance to internal strain is maintained equal in fact and effect as regards rim contact, as each layer of the strain resisting fabric adjacent to the outside edge of the rim on one side approaches the tire edge from the inside on the other.

The primary object of my invention is to provide a tire casing of the type having a thread, cord, band, or web strain resisting fabric, in which the strain imposed on the members composing the fabric will be balanced or equally distributed so as to realize the maximum strength and durability and minimize the liability of separation of the layers of the fabric, by utilizing the pressure of the contained air to strengthen the frictional resistance to the separation of the layers of fabric.

A further object of my invention is to provide a pneumatic tire casing which will possess maximum durability and efficiency.

My invention will be more fully disclosed hereinafter with reference to the accompanying drawings, in which the same is illustrated as embodied in a convenient and practical form, and in which—

Figure 1 is a plan view showing the arrangement of the strain resisting fabric; Fig. 2, a cross sectional view through a tire embodying my invention; and Fig. 3, a perspective diagrammatic view of the arrangement of the layers of strain resisting fabric.

The same reference characters are used to designate the same parts in the several figures of the drawings.

Reference character A indicates a pneumatic tire casing in which are arranged adjacent intersecting layers of strain resisting fabric, one layer being composed of bands B and the other layer of bands C. It will of course be understood that while I have shown bands formed of cord or thread as the members composing the strain resisting fabric, that other members, such as cord, thread, etc., not initially formed into bands, may be employed in practically embodying my invention.

D indicates an inner tube and E a rim upon which the tire is mounted.

In the embodiment of my invention herein disclosed, the bands B constituting the members of one layer of the fabric extend from adjacent to one edge of the tire casing across the tire tread to points tangent to the opposite edge of the tire casing and then again across the tread where they terminate adjacent to the first inner edge of the casing. The bands C which form the other layer of the strain resisting fabric are similarly arranged, but extend initially from adjacent to the opposite inner edge of the tire casing across the tread of the tire to points tangent to the opposite inner edge of the casing and thence again across the tire tread where they terminate adjacent to the first inner edge of the casing. Each band B extends from its starting point beneath the bands C to a point at the longitudinal center of the tire casing and thence extends to the outside of the succeeding bands C and overlies the same throughout its portion which extends to the opposite inner edge of the tire and back again to the longitudinal center of the tread whence it lies beneath the bands C to its termination adjacent to the first inner edge of the casing.

The bands C are arranged in a similar manner, that is, each of such bands lies within the bands B at one side of the casing and outside of the bands B at the other side of the casing. As will readily be observed from Fig. 1, the successive bands B and C are interlaced along the longitudinal center of the casing so as to form two layers of fabric intersecting at the longitudinal center of the tire. Each layer so formed lies outside of the adjacent layer at one side of the tire, and inside of the same layer at the other side of the tire.

The laying of the bands B is continued progressively around the tire until the point at the circumference of the casing where the laying commenced is again reached, that is, the arrangement of the bands shown in Fig. 1 will be continued around the tire until the points at the right of the figure are reached, so that there will be two double or intersecting layers.

From the foregoing description it will be observed that I have invented an improved pneumatic tire casing in which the strain resisting fabric consists of adjacent intersecting or interlaced layers, the intersection being formed longitudinally of the tire and intermediate of the side edges by reason of the interlacing of the bands, cords, or threads constituting the members of which the layers of strain resisting fabric are formed. It is obvious that the layers so formed are symmetrical, each layer lying within the other layer at corresponding sides of the tire casing, and outside of the other layer at the opposite corresponding sides of the tire casing. The pressure of the contained air is therefore exerted uniformly and evenly upon both of the layers, thereby balancing the strains to which they are subjected and maintaining them in normal condition. The pressure of the air exerted more directly against the inner portions of the layers forces them outwardly against the outer layers, which are connected to the inner edges of the wheel rim, thereby increasing the frictional resistance to the separation of the two layers.

While I prefer to practically embody my invention in the form illustrated in the drawings, in which the individual bands are of such length as to extend twice across the tread of the tire and to lie tangential to the inner edge of the casing intermediate of the points where they cross the tire, yet it will be understood that my invention is capable of embodiment in other specific forms than that herein illustrated and described.

In the preferred embodiment of my invention, the portions of the bands which lie tangential to the inner edges of the casing serve to form a continuous ring of fabric around the entire circumference of the inner edges of the tire, thus providing a secure attachment of the casing to the rim without extraneous devices.

In the preferred embodiment of my invention illustrated in the drawing in which the strain resisting fabric consists of members extending across the tread at their ends and lying tangent to the inner edge of the casing intermediate of their ends, the ends of the members in adjacent layers being interlaced where they cross the tread, a balance of resistance is obtained to longitudinal strains as well as to transverse strains. In other words, the interlacing of the ends of the members in adjacent layers causes the members in one layer to resist the longitudinal strains imposed upon the members in the other layer.

While I have described more or less precisely the details of construction, I do not wish to be understood as limiting myself thereto, as I contemplate changes in form and the proportion of parts and the substitution of equivalents as circumstances may suggest or render expedient without departing from the spirit of my invention.

I claim:

A pneumatic tire casing comprising a strain resisting fabric composed of members arranged in layers, the members of one layer connecting separated tread points and intermediate of the connected tread points lying tangent to one inner edge of the casing, and the members of the other layer connecting separated tread points and intermediate of the connected tread points lying tangent to the other inner edge of the casing, the members of the two layers being interlaced along the tread of the tire casing so that the portions of the members of each layer which are tangent to the side edges of the casing will occupy an outer plane overlying the extremities of the members of the other layer.

In testimony whereof, I have subscribed my name.

JOHN F. PALMER.

Witnesses:
 HENRY A. PARKS,
 ANNA L. WALTON.